US006799790B2

(12) United States Patent
Sakai et al.

(10) Patent No.: US 6,799,790 B2
(45) Date of Patent: Oct. 5, 2004

(54) AUTOMATICALLY OPENING AND CLOSING SYSTEM FOR VEHICLE

(75) Inventors: Hiroshi Sakai, Kiryu (JP); Yasushi Yoshida, Kiryu (JP); Takashi Hoshino, Isesaki (JP); Seiji Shioiri, Kiryu (JP); Takao Ochiai, Ashikaga (JP); Hideyuki Ogawa, Gunma (JP)

(73) Assignees: Mitsuba Corporation, Gunma (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/357,969

(22) Filed: Feb. 4, 2003

(65) Prior Publication Data

US 2003/0146644 A1 Aug. 7, 2003

(30) Foreign Application Priority Data

Feb. 5, 2002 (JP) ...................................... 2002-028549

(51) Int. Cl.$^{7}$ .................................................. B60J 5/10

(52) U.S. Cl. ........................ 296/146.8; 296/56; 49/341; 49/340

(58) Field of Search ................................ 296/56, 146.8, 296/146.9, 146.11, 193.06; 49/339, 340, 341, 342

(56) References Cited

U.S. PATENT DOCUMENTS

| | | | | |
|---|---|---|---|---|
| 6,055,776 A | | 5/2000 | Dettling et al. | 49/341 |
| 6,298,604 B1 | * | 10/2001 | Rogers et al. | 49/340 |
| 6,367,199 B2 | * | 4/2002 | Sedlak et al. | 49/340 |
| 6,367,864 B2 | * | 4/2002 | Rogers et al. | 296/146.4 |
| 6,378,392 B1 | * | 4/2002 | Dombrowski et al. | 74/422 |
| 6,453,614 B1 | * | 9/2002 | Rogers et al. | 49/340 |
| 2001/0033091 A1 | * | 10/2001 | Rogers et al. | 296/146.4 |
| 2001/0047625 A1 | | 12/2001 | Sedlak et al. | |
| 2003/0136054 A1 | * | 7/2003 | Daniels et al. | 49/340 |
| 2003/0196382 A1 | * | 10/2003 | Yokota | 49/341 |

FOREIGN PATENT DOCUMENTS

| | | | | |
|---|---|---|---|---|
| EP | 1 148 202 A2 | | 10/2001 | |
| JP | 2001-25341 A | * | 9/2001 | B60J/5/10 |

* cited by examiner

*Primary Examiner*—Patricia L. Engle

(74) *Attorney, Agent, or Firm*—McCormick, Paulding & Huber LLP

(57) ABSTRACT

An appearance of a vehicle is improved by reducing an opening formed in an interior trim for vehicle. An actuator unit is mounted in a pillar of the vehicle, and a linking rod is linked to a rack bar, which linearly reciprocates along an axial direction provided at this actuator unit. This linking rod protrudes from the pillar through the opening formed in an interior trim, and the other end thereof is linked to a back door. Moreover, this actuator unit is disposed so that a moving direction of the rack bar inclines on a vehicle-rear side by an opening/closing inclination angle α with respect to a direction perpendicular to the vehicle and inclines inward in a vehicle-width direction by a width inclination angle.

18 Claims, 9 Drawing Sheets

4a
14
13
7
15
16
A
6
α
R=0.61°
R=10.9°
R=13.34°
R=11.75°
R=7.38°
VEHICLE-LONGITUDINAL DIRECTION
VEHICLE-FRONT SIDE 4a
14
13
7
21
6
16
B
β
r=1.08°
r=5.41°
r=9.56°
r=14.02°
r=17.59°
WIDTH DIRECTION

| OPENING ANGLE OF BACK DOOR | ANGLE R (°) | ANGLE r (°) |
|---|---|---|
| 0 | 0.61 | 1.08 |
| 10 | 4.79 | 2.20 |
| 20 | 8.26 | 3.65 |
| 30 | 10.90 | 5.41 |
| 40 | 12.62 | 7.40 |
| 50 | max 13.34 | 9.56 |
| 60 | 13.05 | 11.80 |
| 70 | 11.75 | 14.02 |
| 80 | 9.49 | 16.16 |
| 87 | 7.38 | max 17.59 |

AUTOMATICALLY OPENING AND CLOSING SYSTEM FOR VEHICLE

This application is entitled to the benefit of and incorporates by reference essential subject matter disclosed in Japanese Patent Application No. 2002-28549 filed on Feb. 5, 2002.

BACKGROUND OF THE INVENTION

The present invention relates to an automatically opening and closing system for vehicle, which automatically opens and closes an opening/closing member openably and closably mounted on the vehicle through a hinge.

In vehicles such as automobiles or the like, there has conventionally been provided everywhere an opening/closing member openably and closably mounted on a vehicle through a hinge, such as a door, a back door and the like. Particularly, in wagon cars and one-box cars, etc., there are often found ones, each of which is provided with a back door on the rear end of the vehicle to allow for easily loading and unloading, etc. from the rear side thereof. Since the hinge is ordinarily provided at a rear end of a vehicle roof, that is, a ceiling portion of the vehicle with its opening/closing central axis being kept substantially horizontal, such back door is opened and closed between a fully closed state where the back door is substantually perpendicular with respect to the vehicle and a fully opened state where the back door is substantially horizontal with respect to the vehicle, with using this opening/closing central axis as a center. In this case, the back door is lifted in an upward direction of the vehicle, therefore being called a lift gate, a rear hatch or the like.

However, since such back door is often large and heavy, there has particularly been the case where it is difficult for women and children to easily open and close the back door. Also, the back door is largely lifted up when coming to a fully opened state, so that the opening and closing of it become more difficult.

Thereat, under circumstances where one-box cars and the like increase for family use, there appear vehicles equipped with an automatically opening and closing system in the back door so that even women and children can easily open and close it, and there is a trend toward an increase of the number of such cars. Further, if the automatically opening and closing system is provided, then the back door can be remote-controlled even when no hand reaches from a driver's seat, so that there are many requests for mounting the automatically opening and closing system due to this convenience.

As such an automatically opening and closing system for back door, an actuator unit operated by an electric motor is generally used. The actuator unit is provided with a reciprocating member to be swung or linearly reciprocated by the electric motor, and a linking rod having a base side joint and a tip side joint that are swingably linked to the reciprocating member and the back door, respectively, whereby the opening and closing thereof are performed by transmitting displacement of the reciprocating member to the back door through the linking rod. As an example of a reciprocating member performing swinging motion, for example, U.S. Pat. No. 6,055,776 discloses one having a sector gear that is rotatably mounted to a pillar of the vehicle with its rotation supporting point being kept substantially horizontal. In this case, a pinion gear, rotation-driven by the electric motor, is engaged with the sector gear, whereby the sector gear performs the swinging motion in a substantially vertical direction with respect to the vehicle, with using the rotation supporting point as a center, by operating the electric motor. The linking rod is linked to the peripheral side of this sector gear, and so the swinging motion of the sector gear is transmitted to the back door through the linking rod to automatically open and close the back door.

Also, as an example of a reciprocating member linearly reciprocating, for example, Japanese Patent Laid open No. 2001-253241 discloses one, which is provided with a rack bar movably disposed axially in an annular and square-shaped channel fixed to the vehicle. In this case, the rack bar is provided with a rack gear aligned axially, and a pinion gear driven by an electric motor is engaged with this rack gear. Therefore, the rack bar is linearly reciprocated axially in the channel by operating the electric motor. The linking rod is linked to this rack bar, and a linear reciprocation of the rack bar is transmitted to the back door through the linking rod to automatically open and close the back door.

Such actuator unit is disposed in the pillar of the rear end of the vehicle, that is, between an exterior panel and an interior trim for vehicle in the pillar. In opening the back door, in the actuator unit utilizing the sector gear a part of the sector gear and the linking rod protrude from a slit formed in the interior trim for vehicle. In contrast, in the actuator unit utilizing the rack bar only the linking rod protrudes from the slit formed in the interior trim for vehicle.

SUMMARY OF THE INVENTION

However, in such actuator unit, for example, in the case of the actuator unit utilizing the sector gear, the sector gear has a large radius in order to obtain a predetermined swinging stroke, and the part of the sector gear also protrudes from the slit formed in the interior trim for vehicle at the time of the fully opened state of the back door. For this reason, the slit formed in the interior trim for vehicle also becomes enlarged longitudinally.

Also, in the case of the actuator unit utilizing the rack bar, the actuator unit is mounted in a limited space in the pillar and is disposed so that the moving direction of the rack bar is perpendicular to the vehicle. Therefore, when the back door is opened and closed, the base side joint moves in the vertical direction, that is, in the up and down direction with respect to the vehicle. In contrast to this, the tip side joint, serving as a connecting point of the back door and the linking rod, moves along an arc centered about the opening/closing central axis of the hinge. Therefore, the moving direction of the base side joint is widely different from that of the tip side joint. For this reason, in opening and closing the back door, an angle of the longitudinal direction of the vehicle, which is defined by the linking rod and the moving direction of the rack bar, is largely changed. Thereby, a locus of the linking rod enlarges and the slit formed in the interior trim enlarges, which results in the marring of the appearance of the vehicle.

An object of the present invention is to improve the appearance of a vehicle by reducing an opening formed in an interior trim for vehicle.

According to the present invention, an automatically opening and closing system for vehicle, which automatically opens and closes an opening/closing member openably and closably mounted on a vehicle through a hinge, comprises: a linking rod to which a tip side joint is swingably linked in said opening/closing member away from an opening/closing central axis of said hinge; a reciprocating member to which a base side joint of said linking rod is swingably linked and which is movably provided to said vehicle in an opening/ closing inclination direction so that as said opening/closing member moves from a fully opened state to a fully closed state, said base side joint is separated to an opening/closing direction with respect to said opening/closing member; and a driving means for opening and closing said opening/closing member by linearly reciprocating said reciprocating member in said opening/closing inclination direction.

In the automatically opening and closing system for vehicle according to the present invention, a position of said tip side joint at the time when said opening/closing member comes to a fully closed state is placed on an intersection of a moving locus of said tip side joint and said opening/closing inclination direction; and said tip side joint at the time when said opening/closing member comes to a fully opened state is placed between said opening/closing inclination direction and a tangent parallel to said opening/closing inclination direction and contacting to the moving locus of said tip side joint.

In the automatically opening and closing system for vehicle according to the present invention, positions of said tip side joint at the time when said opening/closing member comes to the fully opened state and the fully closed state are placed on said opening/closing inclination direction, and wherein a swinging angle of the opening/closing direction of said linking rod with respect to said opening/closing inclination direction reaches a maximum at an intermediate opening angle of said opening/closing member and reduces as the opening/closing member moves toward the fully closed state and the fully opened state.

In the automatically opening and closing system for vehicle according to the present invention, said reciprocating member is provided so that as said opening/closing member moves from the fully opened state to the fully closed state, said base side joint is separated in a width direction with respect to said opening/closing member; and a position of said tip side joint at the fully closed state of said opening/closing member is located in vicinity of a position of said base side joint at the fully opened state, and a swinging angle of the width direction of said linking rod with respect to a reciprocating direction of said reciprocating member increases in proportion to opening angles when said opening/closing member moves from the fully closed state to the fully opened state.

In the automatically opening and closing system for vehicle according to the present invention, said hinge is provided at a rear end of a vehicle roof, and said opening/closing member is openably and closably mounted on the rear end of the vehicle; and said reciprocating member is movably provided in said opening/closing inclination direction so that said base side joint is separated to a front side of said vehicle with respect to said opening/closing member as said opening/closing member moves from the fully opened state of being substantially horizontal with respect to the vehicle to the fully closed state of being substantially perpendicular.

In the automatically opening and closing system for vehicle according to present invention, said reciprocating member is movably provided in said width inclination direction so that said base side joint is separated outwards in the width direction of said vehicle with respect to said opening/closing member as the opening/closing member moves from the fully opened state of being substantially horizontal with respect to said vehicle to the fully closed state of being substantially perpendicular.

In the automatically opening and closing system for vehicle according to the present invention, said reciprocating member is disposed between an exterior panel and an interior trim in a pillar adjacent to said opening/closing member of said vehicle; and said linking rod protrudes from an opening formed in said interior trim.

In the automatically opening and closing system for vehicle according to present invention, said driving means has an electric motor and an output pinion gear driven by said electric motor, and wherein said reciprocating member is provided with a rack gear engaged with said output pinion gear.

According to the present invention, the locus of the linking rod can be reduced by suppressing the change in the angles of the linking rod with respect to the reciprocating member, which change depending on the opening/closing motion of the opening/closing member. Therefore, it is possible to reduce the opening formed in the exterior panel or the interior trim of the vehicle and thereby improve the appearance of the vehicle.

DESCRIPTION OF THE PREFERRED EMBODIMENT

An embodiment of the present invention will be below described in detail with reference to the drawings.

Figure 1:
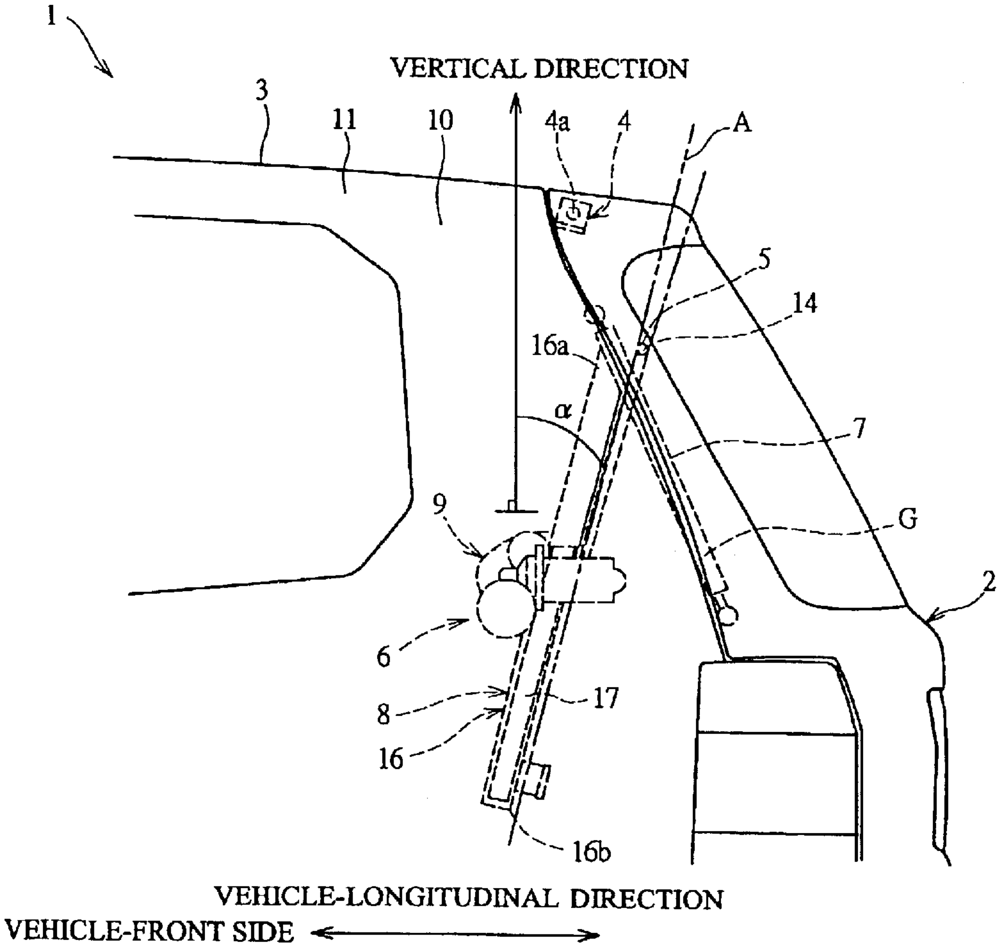
FIG. 1 is a side view of a part of a vehicle equipped with an actuator unit according to an embodiment of the present invention, showing a fully closed state of a back door.
Figure 2:
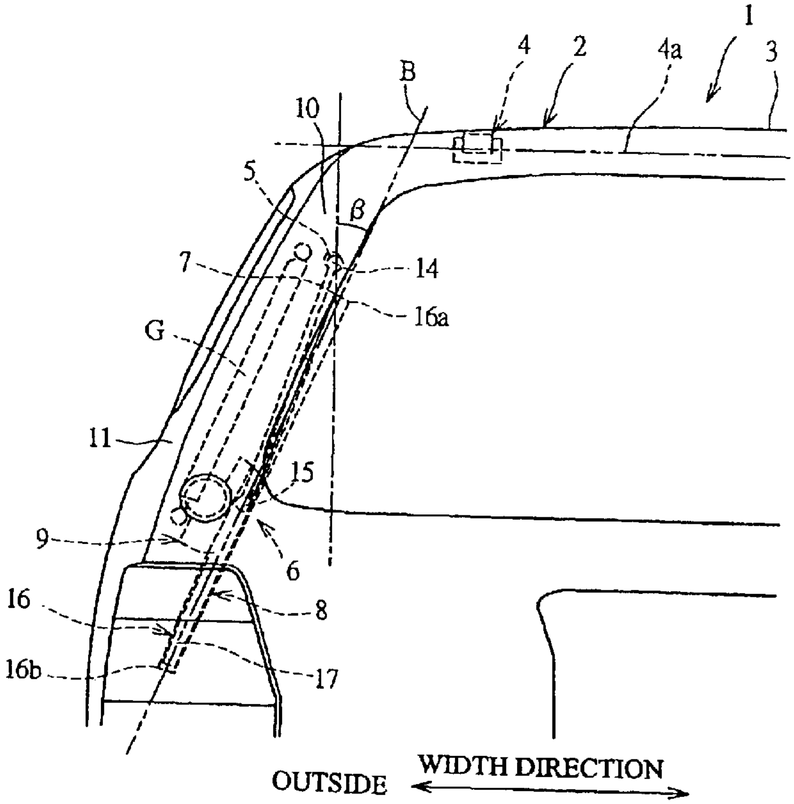
FIG. 2 is a rear view showing a part of the vehicle illustrated in FIG. 1.
Figure 3:
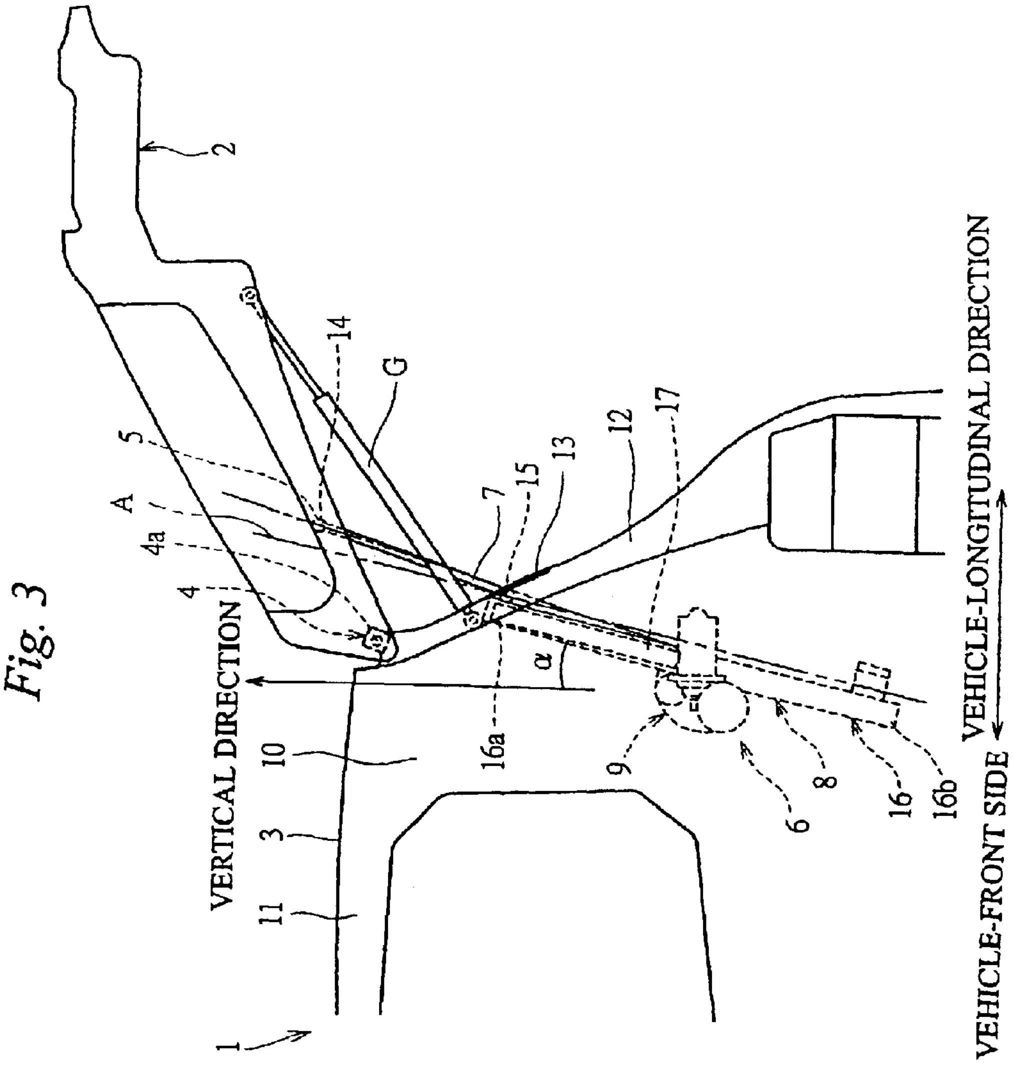
FIG. 3 is a side view of a part of the vehicle illustrated in FIG. 1, showing a fully opened state of the back door.
Figure 4:
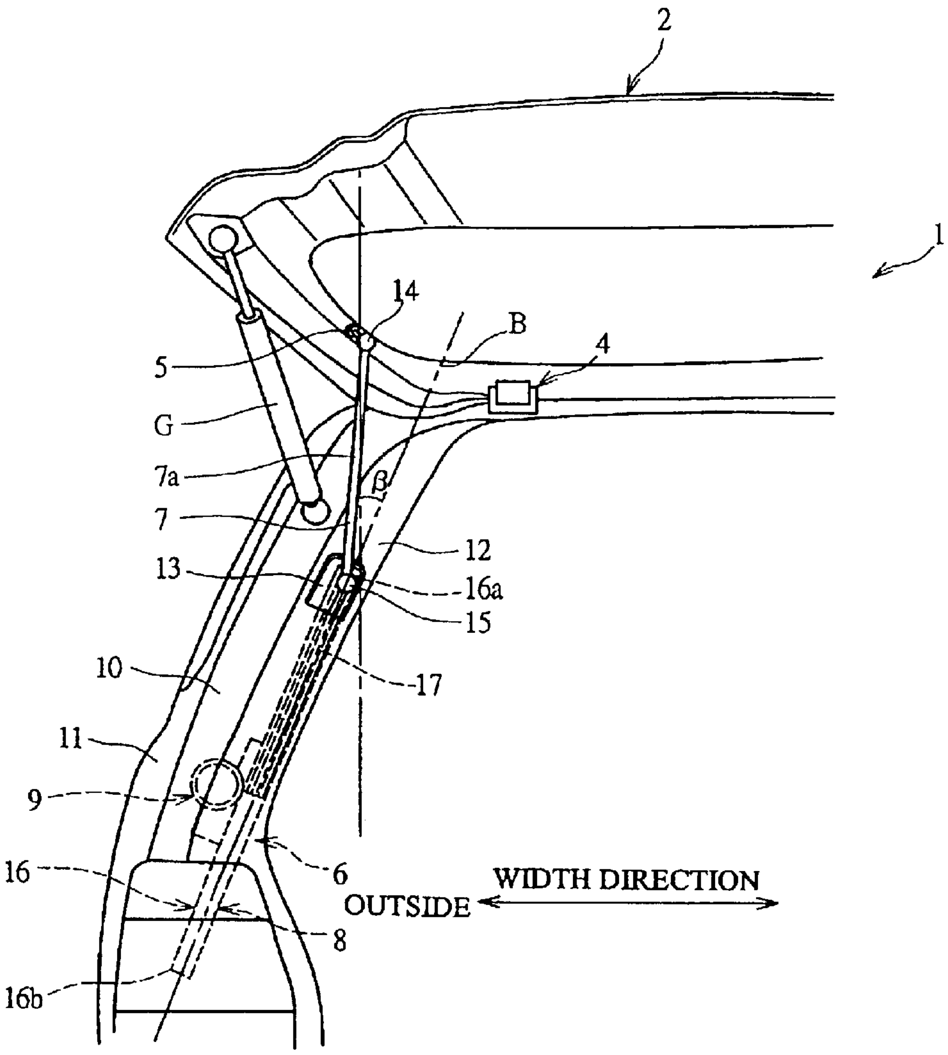
FIG. 4 is a rear view showing a part of the vehicle illustrated in FIG. 3.
Figure 5:
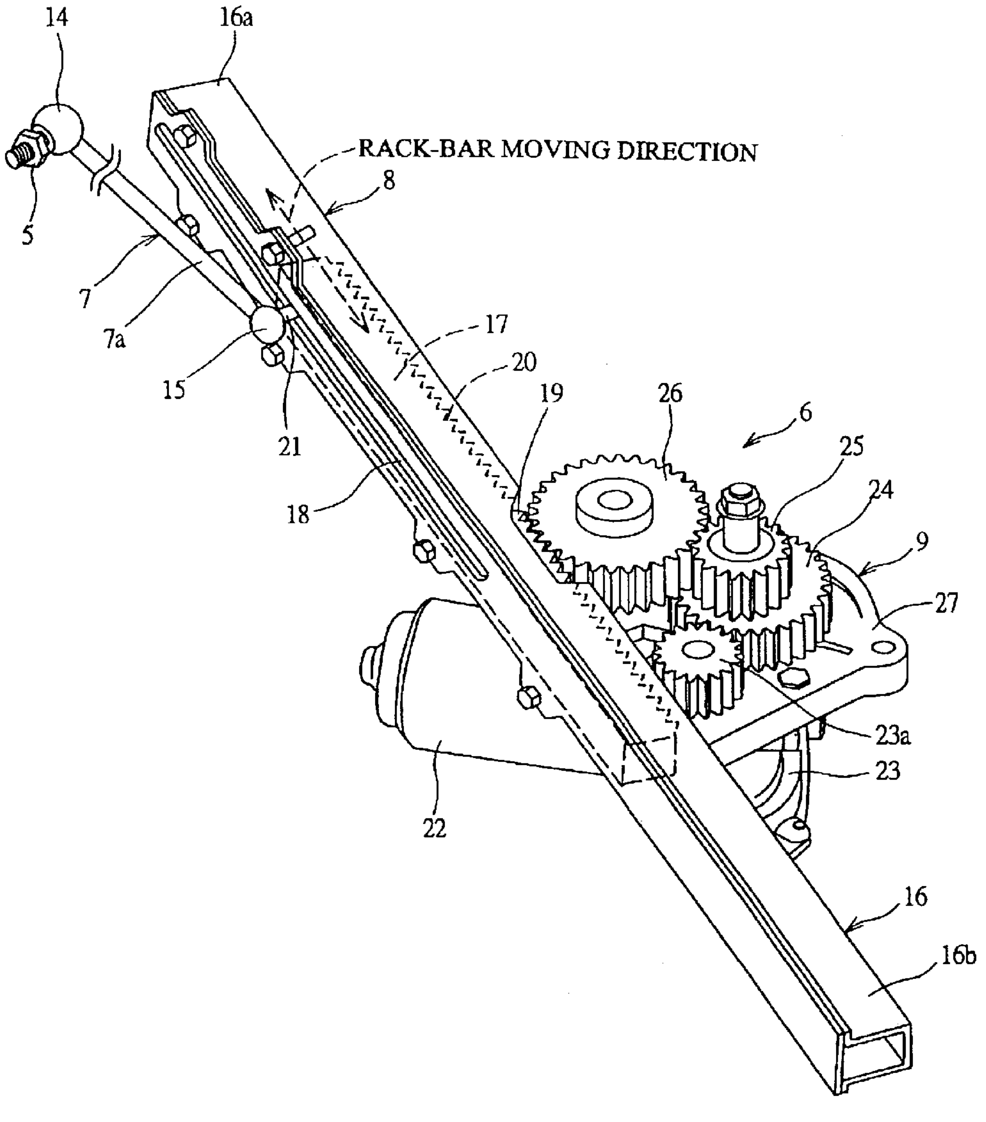
FIG. 5 is a perspective view showing a detailed construction of the actuator unit illustrated in FIGS. 1 to 4.

FIG. 1 is a side view of a part of a vehicle equipped with an actuator unit according to an embodiment of the present invention, showing a fully closed state of a back door, and FIG. 2 is a rear view showing a part of the vehicle illustrated in FIG. 1. Also, FIG. 3 is a side view of a part of the vehicle illustrated in FIG. 1, showing a fully opened state of the back door, and FIG. 4 is a rear view showing a part of the vehicle illustrated in FIG. 3. Further, FIG. 5 is a perspective view showing a detailed construction of the actuator unit illustrated in FIGS. 1 to 4.

As shown in FIGS. 1 to 4, a rear end of a vehicle 1 is provided with a back door 2. The back door 2 is openably and closably mounted to the vehicle 1 through a hinge 4, which is attached to a rear end of a vehicle roof 3 with its opening/closing central axis 4*a* being kept substantially horizontal. Thereby, the rear end of the vehicle 1 is opened and closed between a fully closed state which is substantially perpendicular to the vehicle 1 as shown in FIGS. 1 and 2 and a fully opened state which is substantially horizontal to the vehicle 1 as shown in FIGS. 3 and 4, by moving in its opening/closing direction, that is, in the longitudinal direction of the vehicle within the range of about 90 degrees obtained by defining the opening/closing central axis 4*a* as a center. Note that although the hinge 4 is attached to the rear end of the vehicle roof 3 in this embodiment, the present invention is not limited to this. Also, note that the present invention may be such that the hinge 4 is attached to a side of the vehicle 1 with its opening/closing central axis 4*a* being kept substantially vertical and the back door 2 is opened and closed in its lateral direction with respect to the vehicle 1, and further such that a range of the opening and closing is not limited to about 90 degrees and is set to a desired angle.

A ball stud 5 is fixed to the left side of the back door 2 in the width direction away from the opening/closing central axis 4*a* of the hinge 4. Also, between the rear end of the vehicle 1 and the back door 2, there is attached a gas damper G expanding and contracting in accordance with the opening and closing of the back door 2, thereby reducing the load of the back door 2 in the opening/closing direction.

The vehicle 1 is provided with an actuator unit 6 as an automatically opening and closing system for vehicle in order to automatically open and close the back door 2. This actuator unit 6 has a linking rod 7, a sliding mechanism 8, and a power unit 9 and is disposed at the inside of a vehicle-left-side pillar 10 adjacent to the back door 2, that is, between an exterior panel 11 and an interior trim 12 in the pillar 10. A substantially rectangular opening 13 is formed in the interior trim 12, whereby the inside of the interior trim 12 and the back door 2 are spatially brought into communication with each other. Note that although only one actuator unit 6 is provided in this embodiment, the present invention is not limited to this and may be such that a plurality of actuator units is provided. Also, note that although the actuator unit 6 is mounted inside the left-side pillar 10 of the vehicle 1 in this embodiment, the present invention is not limited to this and may be such that the actuator unit 6 is mounted in either of the left-side and the right-side pillars and such that in the case of providing a plurality of actuator units 6, they are mounted in both side pillars. In this case, these actuator units 6 may be formed symmetrically. Moreover, a dust cover and the like, formed by an elastic material such as a rubber or the like, may be attached to the opening 13.

The linking rod 7 has a construction in which a ball socket 14 as a tip side joint and a ball socket 15 as a base side joint are fixed to both ends of a rod 7*a* formed by a steel material, and is disposed so as to protrude from the inside of the pillar 10 through the opening 13 toward the back door 2. Moreover, the linking rod 7 is swingably connected to the back door 2 by engaging the ball socket 14 with the ball stud 5 of the back door 2.

As shown in FIG. 5, the sliding mechanism 8 has a channel 16 and a rack bar 17 movably disposed in the channel 16. The channel 16 is formed like a square pipe having a straight hollow portion, and has on its side surface a slot 18 extending along its axial direction, from a substantially central portion of its longitudinal direction, toward a tip portion 16*a* to be located at an upper side with respect to the vehicle 1. On a side surface opposite to the side surface on which the slot 18 is formed, a window portion 19 is formed which is opened at a substantially middle part of the longitudinal direction. The rack bar 17 is formed in a shape like a square pole having a length of substantially half the channel, and is movably disposed axially inside the channel 16. A rack gear 20 aligned axially is formed on a side surface facing the window portion 19 of the rack bar 17. On a side surface opposite to the side surface on which the rack gear 20 is formed, a ball stud 21 as a reciprocating member is fixed at the tip portion 16*a* to be located at the upper side with respect to the vehicle 1. This ball stud 21 protrudes outside the channel 16 through the slot 18, and allows for moving along this slot 18 together with the movement of the rack bar 17. Another end of the linking rod 7, i.e., the ball socket 15 is swingably linked to this ball stud 21. That is, the rack bar 17 and the back door 2 are linked through the linking rod 7, and thus when the rack bar 17 is moved axially, the displacement thereof is transmitted to the back door 2 through the linking rod 7, whereby the back door 2 is opened and closed.

Here, as shown in FIGS. 1 and 3, the channel 16 is disposed, with only an opening/closing inclination angle $\alpha$ being inclined on a vehicle-rear side with respect to the vertical axis of the vehicle 1 so that the tip portion 16*a* to be located on the vehicle-upper side is positioned nearer to the rear side of the vehicle 1 than a root portion 16*b* to be located at the vehicle-lower side thereof. The ball stud 21 is moved along an opening/closing inclination direction A indicated by the dot-dash lines in FIG. 1 so that as the back door 2 moves from the fully opened state to the fully closed state, the ball socket 15 of the linking rod 7 is separated in the opening/closing direction with respect to the back door 2, that is, on vehicle-front side in the longitudinal direction of the vehicle 1.

As shown in FIGS. 2 and 4, the channel 16 is also disposed, with only a width inclination angle $\beta$ being inclined at the inside of the vehicle 1 with respect to the vertical direction of the vehicle 1 so that the tip portion 16*a* is positioned nearer to the inside of the vehicle 1 than the root portion 16*b*. The ball stud 21 is moved along a width inclination direction B indicated by the dot-dash lines in FIG. 2 so that as the back door 2 moves from the fully opened state to the fully closed state, the ball socket 15 is separated in the width direction with respect to the back door 2, that is, outside in the width direction of the vehicle 1.

The power unit 9 has an electric motor 22, a worm gear mechanism 23, first and second reduction gears 24 and 25, and an output pinion gear 26, and is fixed at a substantially central portion of the channel 16 on a base block 27. The electric motor 22 is connected to a not-shown control unit mounted in the vehicle 1, and is normally and reversely rotated by a current supplied based on a command from a not-shown back door opening/closing switch provided in a vehicle compartment and the like. The worm gear mechanism 23 is connected to the electric motor 22, and reduces an output power of the electric motor 22 and at the same time converts its rotational direction to be output from an output gear 23*a*. Moreover, rotation of the output gear 23*a* is reduced through the first and second reduction gears 24 and 25, and is transmitted to the output pinion gear 26. That is, the output pinion gear 26 is normally and reversely rotation-driven by the electric motor 22. The output pinion gear 26 is engaged with the rack gear 20 of the rack bar 17 in the window portion 19, thereby enabling the rack bar 17 to linearly reciprocate in the axial direction of the channel 16.

FIGS. 6A to 6E are explanatory views showing a change in angles of the vehicle-longitudinal direction of the linking rod, which depend on opening/closing motion of the back door, respectively, and FIGS. 7A to 7E are explanatory views showing a change in angles of the vehicle-width direction of the linking rod, which depend on opening/closing motion of the back door. Also, FIG. 8 is a numerical value table showing details of the change in the angles of the linking rod illustrated in FIGS. 6 and 7, and FIG. 9 is a perspective view showing a locus of the linking rod in the opening.

Next, operations of the above actuator unit 6 will be explained.

When an open-side button of a not-shown back door opening/closing switch is turned on at the time of fully closed state of the back door 2, the opening motion of the back door 2 is started. That is, a current from a not-shown control unit is supplied to the electric motor 22, so that the output pinion gear 26 is rotated clockwise in FIG. 5. Then, this rotation of the output pinion gear 26 is transmitted to the rack bar 17 through the rack gear 20 toward a first to second position, that is, causes the rack bar 17 to move upward with respect to the vehicle 1, whereby the back door 2 is moved toward the fully opened state shown in FIGS. 3 and 4.

Next, when a close-side button of the not-shown back door opening/closing switch is turned on at the time of the fully opened state of the back door 2, a current from the not-shown control unit, which is reverse to the current at the time of turning on the open-side button, is supplied to the electric motor 22, so that the output pinion gear 26 is rotated counterclockwise in FIG. 4. Then, this rotation of the output pinion gear 26 is transmitted to the rack bar 17 through the rack gear 20 toward the second to first position, that is, causes the rack bar 17 to move downward with respect to the vehicle 1, whereby the back door 2 is moved toward the fully closed state shown in FIGS. 1 and 2.

At this time, as shown in FIGS. 6A to 6E, the linking rod 7 operates while changing its swinging angles of the reciprocation direction of the rack bar 17, that is, the opening/closing direction with respect to the axial direction of the channel 16, namely, the vehicle-longitudinal direction. Also, s shown in FIGS. 7A to 7E, the linking rod 7 operates while changing its swinging angles of the reciprocation direction of the rack bar 17, that is, the width direction with respect to the axial direction of the channel 16, namely, the vertical-width direction.

Figures 6A, 6B, 6C, 6D, 6E:
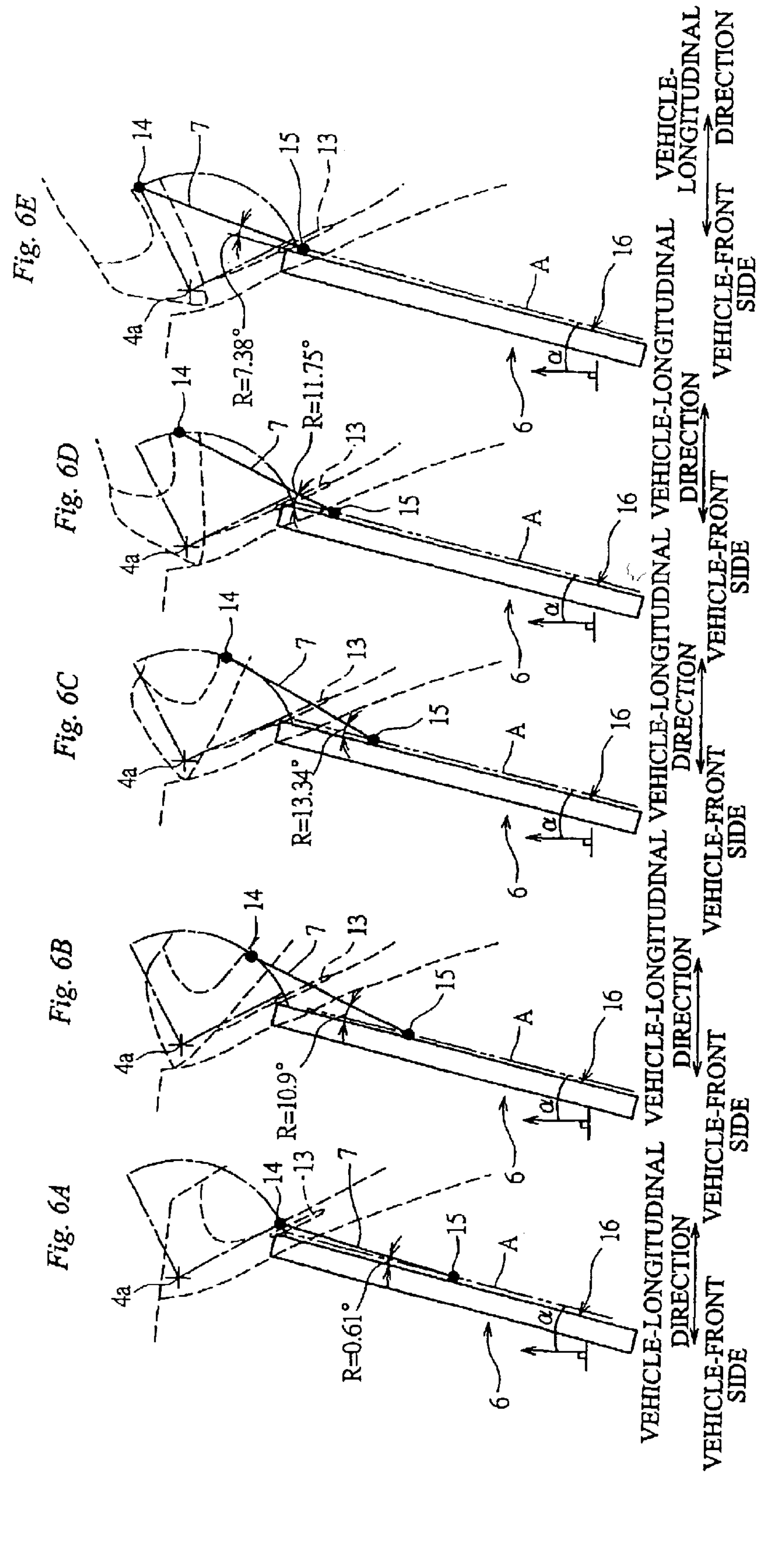
FIG. 6A is an explanatory view showing a change in angles of the longitudinal direction of the vehicle, which depend on an opening and closing operation of the back door.
FIG. 6B is an explanatory view showing a change in angles of the longitudinal direction of the vehicle, which depend on an opening and closing operation of the back door.
FIG. 6C is an explanatory view showing a change in angles of the longitudinal direction of the vehicle, which depend on an opening and closing operation of the back door.
FIG. 6D is an explanatory view showing a change in angles of the longitudinal direction of the vehicle, which depend on an opening and closing operation of the back door.
FIG. 6E is an explanatory view showing a change in angles of the longitudinal direction of the vehicle, which depend on an opening and closing operation of the back door.

In short, as shown in FIG. 6A, an angle R of the vehicle-longitudinal direction, which is defined by the axial direction of the channel 16 and the linking rod 7, is 0.61 degree when an opening angle of the back door 2 is 0 degree, that is, the back door 2 is in the fully closed state. However, when the rack bar 17 starts moving from the first position to the second position, the angle R increases in accordance with the opening angle of the back door 2. For example, as shown in FIG. 6B, when the opening angle of the back door 2 reaches 30 degrees, the angle R increases to 10.90 degrees. Then, as shown in FIG. 6C, when the opening angle of the back door 2 reaches 50 degrees that is a substantially intermediate opening angle, the angle R increases to 13.34 degrees. Moreover, when the rack bar 17 moves and the opening angle of the back door 2 exceeds the substantially intermediate opening angle, the angle R reduces. For example, as shown in FIG. 6D, when the opening angle of the back door 2 reaches 70 degrees, the angle R reduces to 11.75 degrees. As shown in FIG. 6E, when the rack bar 17 moves further and the opening angle of the back door 2 reaches 87 degrees, that is, when the back door 2 comes to the fully opened state, the angle R reduces to 7.38 degrees. Thus, as seen from FIG. 8, the angle R reaches a maximum value at the substantially intermediate opening angle of the back door 2, and changes so that it reduces as the back door 2 moves toward the fully opened state or the fully closed state. At this time, since the ball socket 15 moves with the rack bar 17 in the axial direction of the channel, the change in the angle R is one obtained by the ball socket 15 serving as a supporting point. Therefore, the locus of the linking rod 7, which depends on the opening and closing of the back door 2, is within a narrow range that depends on only a small change in the angles obtained from the ball socket 15 serving as a supporting point, and the locus of the linking rod 7 in the opening 13 also has a narrow range of the vertical direction of the opening 13.

Figures 7A, 7B, 7C, 7D, 7E:
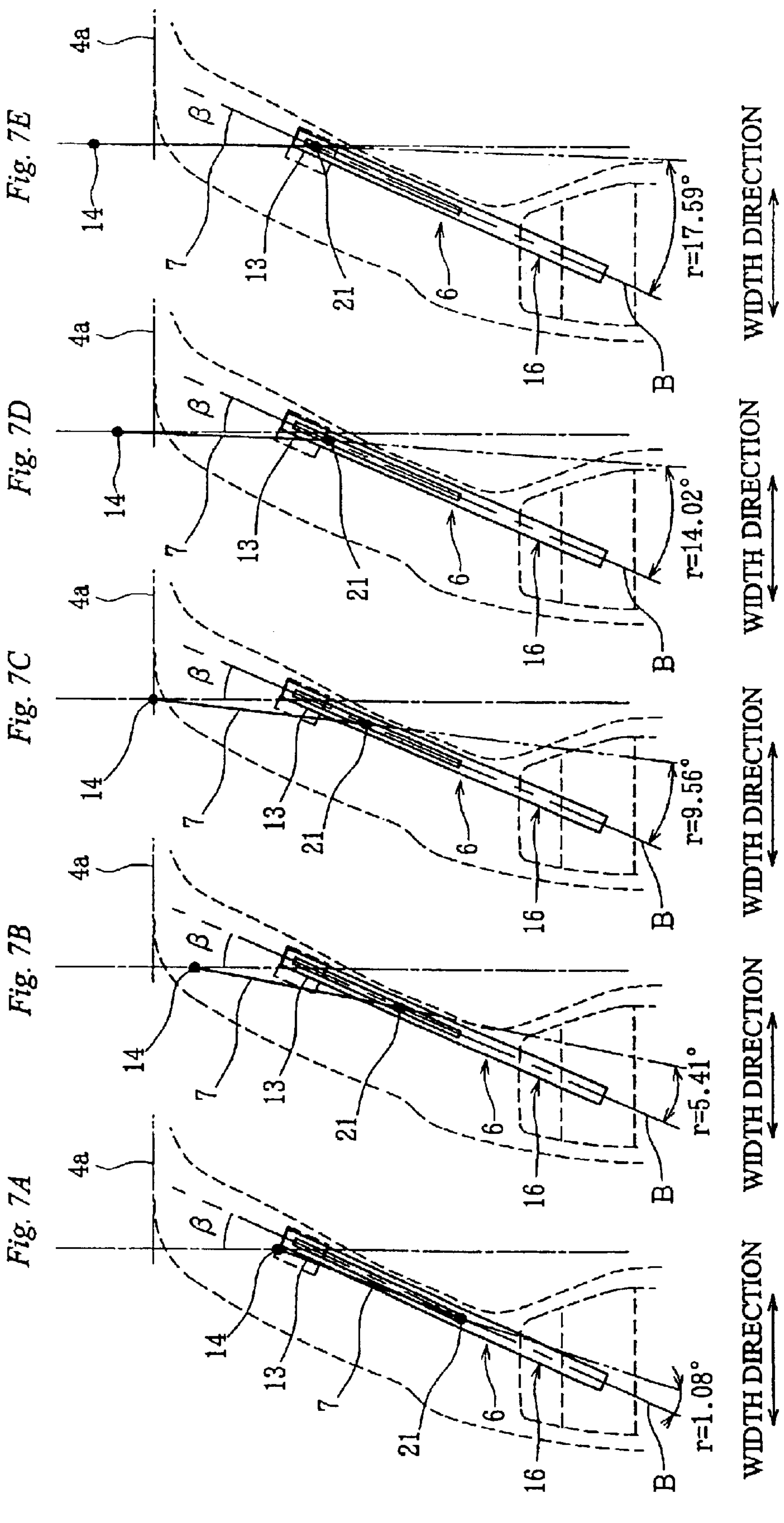
FIG. 7A is an explanatory view showing a change in angles of the width direction of the vehicle, which depend on an opening and closing operation of the back door.
FIG. 7B is an explanatory view showing a change in angles of the width direction of the vehicle, which depend on an opening and closing operation of the back door.
FIG. 7C is an explanatory view showing a change in angles of the width direction of the vehicle, which depend on an opening and closing operation of the back door.
FIG. 7D is an explanatory view showing a change in angles of the width direction of the vehicle, which depend on an opening and closing operation of the back door.
FIG. 7E is an explanatory view showing a change in angles of the width direction of the vehicle, which depend on an opening and closing operation of the back door.
Figures 8, 9:
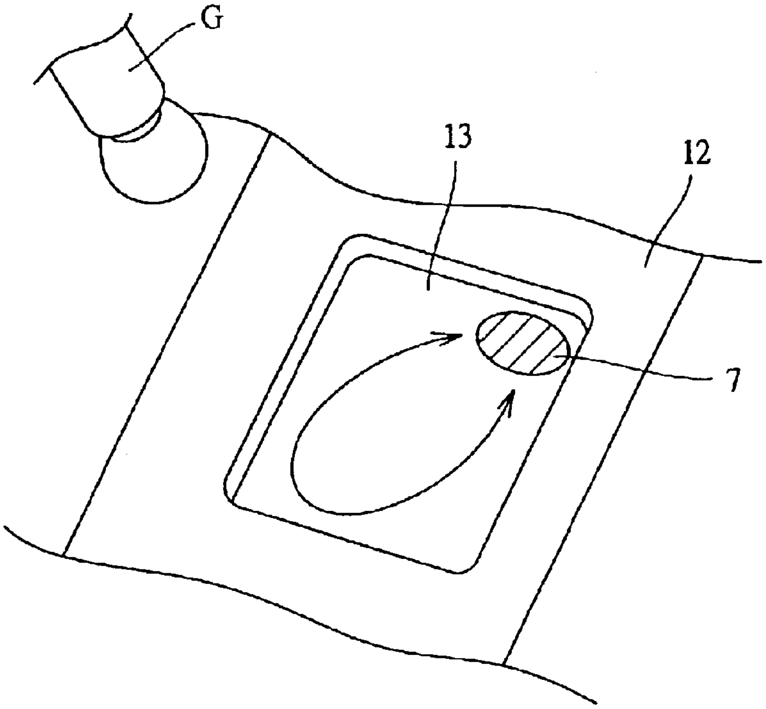
FIG. 8 is a numerical value table showing details of the change in the angles of the linking rod illustrated in FIGS. 6 and 7.
FIG. 9 is a perspective view showing a locus of the linking rod in an opening.

Meanwhile, as shown in FIG. 7A, an angle r of the vehicle-lateral direction, which is defined by the axial direction of the channel 16 and the linking rod 7, is 1.08 degrees when the opening angle of the back door 2 is 0 degree, that is, when the back door 2 comes to the fully closed state. However, when the rack bar 17 starts moving from the first position to the second position, the angle r increases to 5.41 degrees, 9.56 degrees and 14.02 degrees, as shown in FIGS. 7B to 7D, respectively. As shown in FIG. 7E, when the opening angle of the back door 2 reaches 87 degrees, that is, when the back door 2 comes to the fully opened state, the angle r increases to 17.59 degrees. Thus, as seen from FIG. 8, the angle r changes so that it increases in proportion to the opening angle of the back door 2. At this time, since the ball socket 14 moves in the vertical direction with respect to the opening/closing central axis 4*a* of the hinge 4, that is, in a direction perpendicular to the vehicle, the change in the angle r is one obtained by this ball socket 14 serving as a supporting point. Therefore, the locus of the linking rod 7 is formed in such a substantially triangular shape as to be drawn in the opening 13, and the locus of the linking rod 7 in the opening 13 has a narrow range of the lateral direction of the opening 13.

As described above, in the actuator unit 6 of the present invention, it is possible to suppress the change in the angles of the linking rod 7 with respect to the moving direction of the rack bar 17, which change depending on the opening/ closing operation of the back door 2. In the present invention, therefore, as shown in FIG. 9, the locus of the linking rod 7 in the opening 3 can be limited to a narrow range in which the linking rod reciprocates in the lateral direction of the vehicle while reciprocating in the vertical direction of the opening 13, whereby the appearance of the vehicle 1 can be improved if the opening 13 is reduced.

Needless to say, the present invention is not limited to the above-described embodiment and can be variously modified and changed without departing from the gist thereof. For example, although the opening/closing member is the back door 2 mounted to the rear end of the vehicle 1 in this embodiment, the present invention is not limited to this and may use the other one, which is openably and closably mounted to the vehicle 1 through the hinge, such as doors provided on the sides of the vehicle.

Also, the actuator unit 6 in this embodiment is a rack-and-pinion type one having the rack bar 17 and the power unit 9 provided with the output pinion gear 26 for driving the rack bar 17. However, the present invention is not limited to this, and may use the other type one, which has a reciprocating member linearly reciprocating, such as a ball-screw actuator unit or the like having: a male screw member as a driving means driven by the electric motor; and a female screw member engaged with the male screw member as a reciprocating member linearly reciprocating axially depending on the rotation of the male screw member.

Figure 10:
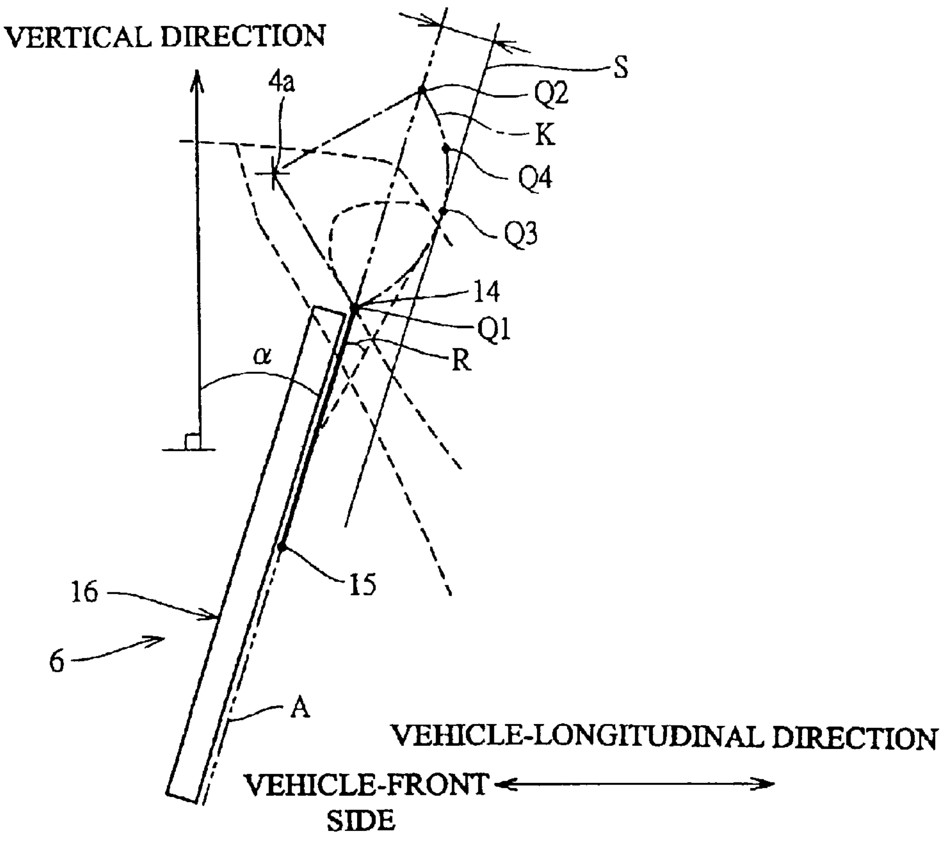
FIG. 10 is an explanatory view showing another example of arrangement of the actuator unit illustrated in FIG. 1.

Moreover, the opening/closing inclination angle $\alpha$ is not only set as described in this embodiment but also may be set, for example, so that, as shown in FIG. 10, positions Q1 and Q2 of the ball socket 14 are respectively disposed on the opening/closing inclination direction A when the back door 2 comes to the fully closed state and the fully opened state, and that the angle R of the vehicle-longitudinal direction of the linking rod 7 reaches a maximum when the back door 2 is at an intermediate opening angle, that is, when the ball socket 14 reaches a position Q3. As shown in FIG. 10, moreover, while the ball socket 14 is kept at the position Q1 at the time when the back door 2 comes to the fully closed state, the ball socket 14 at the time when the back door 2 comes to the fully opened state may be disposed at a position Q4, where is located between the opening/closing inclination direction A and a tangent S parallel to this opening/closing inclination direction A and contacting to the moving locus K of the ball socket 14. Note that the positional relationships among the positions Q1 to Q4, the opening/closing inclination direction A, the moving locus K and the tangent S are indicated based on the case-where these positional relationships are seen as a projected view from the direction of the opening/closing central axis 4*a* of the hinge 4 in FIG. 10.

According to the present invention, the locus of the linking rod can be reduced by suppressing the change in the angles of the linking rod with respect to the reciprocating member, which change depending on the opening/closing motion of the opening/closing member. Therefore, it is possible to reduce the opening formed in the exterior panel or the interior trim of the vehicle and thereby improve the appearance of the vehicle.

What is claimed is:

1. An automatically opening and closing system for vehicle, which automatically opens and closes an opening/closing member openably and closably mounted on a vehicle through a hinge, the system comprising:

a linking rod to which a tip side joint is swingably linked in said opening/closing member away from an opening/closing central axis of said hinge;

a reciprocating member to which a base side joint of said linking rod is swingably linked and which is movably provided to said vehicle in an opening/closing inclination direction so that as said opening/closing member moves from a fully opened state to a fully closed state, said base side joint is moved in an opening/closing direction with respect to said opening/closing member, an upper side of a moving direction of the reciprocating member being inclined toward a vehicle-rear side; and a driving means for opening and closing said opening/closing member by linearly reciprocating said reciprocating member in said opening/closing inclination direction.

2. The automatically opening and closing system for vehicle according to claim 1, wherein a position of said tip side joint at the time when said opening/closing member comes to a fully closed state is placed on an intersection of a moving locus of said tip side joint and said opening/closing inclination direction, and wherein said tip side joint at the time when said opening/closing member comes to a fully opened state is placed between said opening/closing inclination direction and a tangent parallel to said opening/closing inclination direction and contacting to the moving locus of said tip side joint.

3. The automatically opening and closing system for vehicle according to claim 1, wherein positions of said tip side joint at the time when said opening/closing member comes to the fully opened state and the fully closed state are placed on said opening/closing inclination direction, and wherein a swinging angle of the opening/closing direction of said linking rod with respect to said opening/closing inclination direction reaches a maximum at an intermediate opening angle of said opening/closing member and reduces as the opening/closing member moves toward the fully closed state and the fully opened state.

4. The automatically opening and closing system for vehicle according to claim 1, wherein said reciprocating member is provided so that as said opening/closing member moves from the fully opened state to the fully closed state, said base side joint is moved in a width direction with respect to said opening/closing member; and wherein a position of said tip side joint at the fully closed state of said opening/closing member is located in vicinity of a position of said base side joint at the fully opened state, and a swinging angle of the width direction of said linking rod with respect to a reciprocating direction of said reciprocating member increases in proportion to opening angles when said opening/closing member moves from the fully closed state to the fully opened state.

5. The automatically opening and closing system for vehicle according to claims 1, wherein said hinge is provided at a rear end of a vehicle roof, and said opening/closing member is openably and closably mounted on the rear end of the vehicle; and wherein said reciprocating member is movably provided in said opening/closing inclination direction so that said base side joint is moved on a front side of said vehicle with respect to said opening/closing member as said opening/closing member moves from the fully opened state of being substantially horizontal with respect to the vehicle to the fully closed state of being substantially perpendicular.

6. The automatically opening and closing system for vehicle according to claim 5, wherein said reciprocating member is movably provided in said width inclination direction so that said base side joint is separated outwards in the width direction of said vehicle with respect to said opening/closing member as the opening/closing member moves from the fully opened state of being substantially horizontal with respect to said vehicle to the fully closed state of being substantially perpendicular.

7. The automatically opening and closing system for vehicle according to claim 5, wherein said reciprocating member is disposed between an exterior panel and an interior trim in a pillar adjacent to said opening/closing member of said vehicle; and wherein said linking rod protrudes from an opening formed in said interior trim.

8. The automatically opening and closing system for vehicle according to claim 1, wherein said driving means has an electric motor and an output pinion gear driven by said electric motor, and wherein said reciprocating member is provided with a rack gear engaged with said output pinion gear.

9. The automatically opening and closing system for vehicle according to claim 2, wherein positions of said tip side joint at the time when said opening/closing member comes to the fully opened state and the fully closed state are placed on said opening/closing inclination direction, and wherein a swinging angle of the opening/closing direction of said linking rod with respect to said opening/closing inclination direction reaches a maximum at an intermediate opening angle of said opening/closing member and reduces as the opening/closing member moves toward the fully closed state and the fully opened state.

10. The automatically opening and closing system for vehicle according to claim 2, wherein said reciprocating member is provided so that as said opening/closing member moves from the fully opened state to the fully closed state, said base side joint is separated in a width direction with respect to said opening/closing member; and wherein a position of said tip side joint at the fully closed state of said opening/closing member is located in vicinity of a position of said base side joint at the fully opened state, and a swinging angle of the width direction of said linking rod with respect to a reciprocating direction of said reciprocating member increases in proportion to opening angles when said opening/closing member moves from the fully closed state to the fully opened state.

11. The automatically opening and closing system for vehicle according to claim 3, wherein said reciprocating member is provided so that as said opening/closing member moves from the fully opened state to the fully closed state, said base side joint is separated in a width direction with respect to said opening/closing member; and wherein a position of said tip side joint at the fully closed state of said opening/closing member is located in vicinity of a position of said base side joint at the fully opened state, and a swinging angle of the width direction of said linking rod with respect to a reciprocating direction of said reciprocating member increases in proportion to opening angles when said opening/closing member moves from the fully closed state to the fully opened state.

12. The automatically opening and closing system for vehicle according to claim 2, wherein said hinge is provided at a rear end of a vehicle roof, and said opening/closing member is openably and closably mounted on the rear end of the vehicle; and wherein said reciprocating member is movably provided in said opening/closing inclination direction so that said base side joint is separated to a front side of said vehicle with respect to said opening/closing member as said opening/closing member moves from the fully opened state of being substantially horizontal with respect to the vehicle to the fully closed state of being substantially perpendicular.

13. The automatically opening and closing system for vehicle according to claim 3, wherein said hinge is provided at a rear end of a vehicle roof, and said opening/closing member is openably and closably mounted on the rear end of the vehicle; and wherein said reciprocating member is movably provided in said opening/closing inclination direction so that said base side joint is separated to a front side of said vehicle with respect to said opening/closing member as said opening/closing member moves from the fully opened state of being substantially horizontal with respect to the vehicle to the fully closed state of being substantially perpendicular.

14. The automatically opening and closing system for vehicle according to claim 4, wherein said hinge is provided at a rear end of a vehicle roof, and said opening/closing member is openably and closably mounted on the rear end of the vehicle; and wherein said reciprocating member is movably provided in said opening/closing inclination direction so that said base side joint is separated to a front side of said vehicle with respect to said opening/closing member as said opening/closing member moves from the fully opened state of being substantially horizontal with respect to the vehicle to the fully closed state of being substantially perpendicular.

15. The automatically opening and closing system for vehicle according to claim 6, wherein said reciprocating member is disposed between an exterior panel and an interior trim in a pillar adjacent to said opening/closing member of said vehicle; and wherein said linking rod protrudes from an opening formed in said interior trim.

16. The automatically opening and closing system for vehicle according to claim 5, wherein said driving means has an electric motor and an output pinion gear driven by said electric motor, and wherein said reciprocating member is provided with a rack gear engaged with said output pinion gear.

17. The automatically opening and closing system for vehicle according to claim 6, wherein said driving means has an electric motor and an output pinion gear driven by said electric motor, and wherein said reciprocating member is provided with a rack gear engaged with said output pinion gear.

18. The automatically opening and closing system for vehicle according to claim 7, wherein said driving means has an electric motor and an output pinion gear driven by said electric motor, and wherein said reciprocating member is provided with a rack gear engaged with said output pinion gear.

* * * * *